UNITED STATES PATENT OFFICE.

CARL VAN GÜLPEN, OF SAN FRANCISCO, CALIFORNIA.

COMPOSITE FUEL.

SPECIFICATION forming part of Letters Patent No. 308,714, dated December 2, 1884.

Application filed May 12, 1884. (No specimens.)

*To all whom it may concern:*

Be it known that I, CARL VAN GÜLPEN, a citizen of the United States, residing in the city and county of San Francisco, State of California, have invented certain new and useful Improvements in the Production of Composite Fuel; and I do hereby declare that the following is a full, clear, and exact description of my said invention, and of the manner in which I produce and make the same.

My invention relates to the production of a composite fuel from waste and hitherto comparatively worthless matter.

It consists in utilizing coal-dust screenings, the poorer qualities of coal, and such waste matter as vegetable refuse from kitchen and table, the peelings and waste from canning establishments, the waste matter from wine-presses and distilleries, and other refuse vegetable matter in the production of a fuel having superior heat-producing qualities.

The following material is used: first, coal dust and screenings; second, vegetable refuse—such as peelings from potatoes, fruits, and vegetables, fruit-pits, nut-shells, and kitchen refuse, the skins of grapes, and the waste from wine-making establishments, canneries, and distilleries; third, heavy soil and mold, such as clay and adobe ground. These are prepared and combined with certain ingredients, substantially in the following manner, with the aid of suitable machinery, which may be a simple mixing-tub having a rotary mixing device to work the clay, a settling-tub, a common grinding-mill for reducing the vegetable matter, and a rotary drum or barrel for mixing the ingredients together. These are conveniently arranged to facilitate handling and mixing.

To prepare the material: The clay is brought to a condition of powder, free from stones, sand, and other foreign matter, by reducing it in a quantity of water, and then drawing off this fluid mass into a settling-tub, from which the water is drawn off as the solid matter becomes settled. The product is a thick mud, which, being spread out in large shallow pans, is exposed to the sun or to artificial heat, and when hard is broken up and reduced to powder in a suitable grinding apparatus. This operation is well carried on by mixing the clay and water in a tub having an outlet covered by a wire screen, and then drawing off the liquid into a settling-tub. Waste-cocks at different heights from the bottom of this tub afford a means of letting off the water from above the muddy mass as it precipitates and settles to the bottom. The vegetable matter collected from houses, hotels and restaurants, wine-presses, fruit-canning establishments, and distilleries is spread out and dried. Then by a suitable stamping or grinding mill it is reduced to a mass of uniformly fine particles or grains. This material—the clay powder and vegetable matter—is collected and prepared in advance in quantities for subsequent use, as required, in the manufacture of the fuel, for in many cases the vegetable matter is more abundant at some seasons of the year, and for the economical production of the fuel should be prepared when to be had.

To produce a fuel in the form of cakes or blocks from this material, I first form a thick paste of the clay powder, a quantity of flour (wheat, rye, or corn flour, or that from starch) and water. The flour is first reduced by steam or hot water to a pasty mass, and the clay, brought to a like condition, is then mixed and incorporated with the flour, sufficient water being added to properly combine the matter, and also to bring the compound into a suitably soft or thin condition to mix with the other ingredients. This mixture is placed in a large sheet-iron drum or revolving barrel, the coal-screenings and a quantity of the vegetable matter in powder is added, and the whole is thoroughly mixed by rotating the barrel until the contents take the form of a damp sticky mass. This product is formed into blocks or cakes by pressure in molds, and by exposure to heat the blocks are dried. The proportions of these ingredients that I have found satisfactory and productive of good results are: of screenings, fifty to seventy-five per cent.; vegetable matter in powder, twenty-five to fifty per cent.; clay in powder, about fifteen per cent. Four hundred pounds of flour will produce sufficient paste for fifty tons of fuel.

To increase the hardness of the blocks and render them the better transportable, I add a certain quantity of slaked lime to the mixture of clay and flour-paste; but sufficient hardness will be obtained generally from the clay and flour, so that the lime may be left out, if desired.

If it be required to give the fuel-blocks a water-proof surface, I proceed to coat them with a solution of paraffine in benzine, by placing the blocks upon an endless wire-cloth belt and carrying them through a trough or pan containing the water-proof composition. This process will also be found useful in producing a fine quality of fuel from the poorer grades of coal, a suitable crushing and pulverizing apparatus being employed to reduce the coal to a condition of dust or fine grains.

Having thus fully described my invention, what I claim is—

1. A composite fuel composed of coal in the form of dust or screenings, vegetable matter, clay, and a glutinous substance, as flour, all combined together and made into bricks or lumps of uniform mass, substantially as hereinbefore described.

2. In the production of composite fuel from coal dust and screenings, vegetable matter dried and reduced to powder or a condition of uniform size of granules as an ingredient or element of the composition, substantially as herein described.

3. In the production of composite fuel from coal dust and screenings, the combination, with such base or element of vegetable refuse matter dried and reduced to a condition of required fineness, substantially as herein described.

4. In the production of composite fuel from coal dust and screenings, the combination, with such base or element, of clay and flour-paste, to impart qualities of hardness and tenacity to the blocks or formed masses, substantially as described.

5. The combination together of coal in the form of dust, screenings, or pulverized coal, clay, the refuse matter from kitchens, canning establishments, wine-presses and distilleries, and like vegetable matter dried and reduced to powder, and flour-paste, with or without slaked lime, substantially as herein described, producing a compound for the manufacture of composite fuel.

6. The herein-described method or process of making composite fuel, which consists in reducing clay to a condition comparatively pure and a form of powder, then combining this ingredient in a hot and pasty condition with flour-paste; secondly, in reducing vegetable matter, as described, to powder; thirdly, in combining these ingredients and thoroughly mixing them together with coal in the form of dust and screenings; fourthly, in pressing this compound into bricks or cakes and drying the same, substantially as herein described.

CARL VAN GÜLPEN. [L. S.]

Witnesses:
EDWARD E. OSBORN,
J. L. TAGGARD.